UNITED STATES PATENT OFFICE.

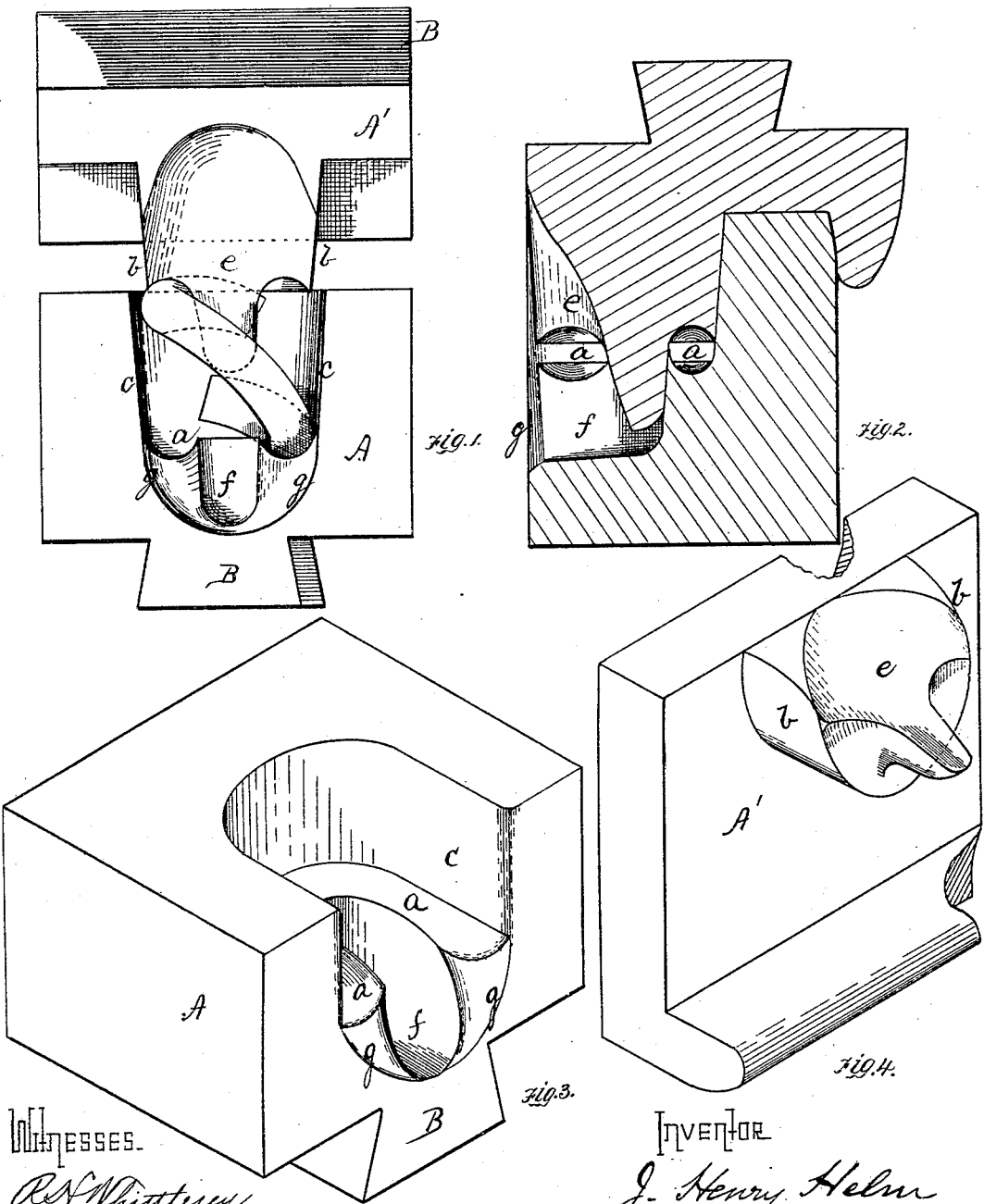

J. HENRY HELM, OF ALLEGHENY, PENNSYLVANIA.

DIE FOR WELDING CHAIN-LINKS.

SPECIFICATION forming part of Letters Patent No. 223,345, dated January 6, 1880.

Application filed October 17, 1878.

*To all whom it may concern:*

Be it known that I, J. HENRY HELM, of Allegheny, in the county of Allegheny and State of Pennsylvania, have invented a new and useful Improvement in Dies for Welding Chain-Links and like Articles; and I do hereby declare the following to be a full, clear, and exact description thereof, reference being had to the accompanying drawings, forming part of this specification, in which—

Figure 1 is a front elevation of dies embodying my invention, the dies being separated and a link inserted in the position for welding. Fig. 2 is a vertical section of the dies. Figs. 3 and 4 are detached views of the dies.

Like letters refer to like parts wherever they occur.

My invention relates to the construction of dies for welding chain-links and similar articles, and is especially adapted to short cable-links; and it consists in the combination of a chambered anvil or stationary link-welding die with a reciprocating link-welding die, the latter having its front and beak so cut away as to accommodate the tongs or like means used to hold the link, and thus prevent displacement of the link and the forcing of the metal over the edge of the welding-cavity during the operation of the dies.

In the class of dies for welding chain-links to which this invention more especially pertains—namely, short cable-links—the operative surfaces have had to be made scarcely, if ever, more than half the length of the link to be welded, in order to accommodate the previously-welded link and the gripe of the tongs on the blank. As a consequence of such construction, the metal forced back in the welding operation carried the link beyond the line of support of the dies, frequently leaving an imperfection along the line of weld, or forming the link of different cross-sectional area on the parallel sides, thus producing imperfect welds and irregularly-shaped links.

The object of the present invention is therefore to make such provision for the tongs and previously-welded links or chain as will permit the length of gripe of the dies to be increased so as to fully support the link at the time of welding, and to thus prevent disfiguring or imperfect welding of the link during the operation of the dies.

I will now proceed to describe my invention, so that others skilled in the art to which it appertains may apply the same.

In the drawings, A indicates the fixed or anvil die, and A' the movable or hammer die, provided with suitable dovetailed projections B, or equivalent means of securing them in the machine wherewith they are employed. The link-cavity $a$ may be of any approved form, and the line of parting of the dies may be at any desired point, all of which, being no part of the present invention, requires no special description here, and may be readily obtained from former patents granted to myself and others.

$b\ c$ indicate the guide-surfaces. They should, when the dies are divided, as shown, be sufficiently high to inclose the spread of the link in order that the die A' in its descent shall force the free ends of the blank across each other to form the lap.

In order to permit the proper introduction of the unwelded link by the tongs or equivalent means, I cut away the front of the dies, (or side at which the link is inserted,) as shown at $e\ f$, so as to form a central recess or cavity which is sufficiently roomy to admit the tongs and end of the previously-welded link on either side of the tongs, and so limited as not to materially trench on the welding-cavity $a$; and in order to accommodate the previously-formed link or chain, the edges of the cavity are rounded off, as at $g$, so that the chain can stand at an angle to the tongs and out of the way.

In employing dies constructed as specified, the bent blank will be properly heated, seized by the tongs at its middle, strung upon the last link of the chain, and introduced into cavity $a$ of the die, the jaws of the tongs resting loosely in the cavity $e\ f$. The movable die then descends and welds the open end of the link, and as, from its shape, it cannot bind on the tongs, there is no displacement or spreading of the link, and as the cavity $a$ or gripe of the dies is so extended as to support the link fully at the time the dies operate, a perfect and sufficient lap-weld is insured, and links of uniform size and shape are obtained. The previously-welded link is thrown on one side or the other of the jaws of the tongs, accordingly as the link is turned over in the die, and the blows repeated until it is finished.

Having thus set forth the nature and advantages of my invention, what I claim, and desire to secure by Letters Patent, is—

1. The combination of a chambered or cut-away reciprocating link-welding die and its beak with a chambered stationary or anvil link-welding die, substantially as and for the purpose specified.

2. The combination of a chambered or cut-away reciprocating link-welding die and its beak with a chambered stationary link-welding die, the cavities having beveled edges, as at $g$, substantially as and for the purpose specified.

In testimony whereof I, the said J. HENRY HELM, have hereunto set my hand.

J. HENRY HELM.

Witnesses:
F. W. RITTER, Jr.,
R. H. WHITTLESEY.